(12) United States Patent
Liu et al.

(10) Patent No.: US 10,545,595 B2
(45) Date of Patent: Jan. 28, 2020

(54) SINGLE-LAYER TOUCH DISPLAY PANEL AND DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan Province (CN)

(72) Inventors: Xu Liu, Beijing (CN); Gang Zhou, Beijing (CN); Limiao Wang, Beijing (CN); Mingzhou Guo, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan Province (CN)

( * ) Notice: Subject to any disclaimer, the term of this patent is extended or adjusted under 35 U.S.C. 154(b) by 0 days.

(21) Appl. No.: 15/933,093

(22) Filed: Mar. 22, 2018

(65) Prior Publication Data

US 2019/0025969 A1    Jan. 24, 2019

(30) Foreign Application Priority Data

Jul. 18, 2017  (CN) .......................... 2017 1 0588244

(51) Int. Cl.
*G06F 3/041*   (2006.01)
*G09G 3/36*   (2006.01)

(52) U.S. Cl.
CPC .......... *G06F 3/0412* (2013.01); *G09G 3/3611* (2013.01); *G09G 2300/0478* (2013.01)

(58) Field of Classification Search
CPC ..... G06F 3/0412; G06F 3/044; G09G 3/3611; G09G 2300/0478
USPC .................................................. 345/173–178
See application file for complete search history.

(56) References Cited

U.S. PATENT DOCUMENTS

| 2011/0149186 | A1* | 6/2011 | Song | .................. G02F 1/136227 349/42 |
| 2013/0328812 | A1* | 12/2013 | Kim | ......................... G06F 3/044 345/173 |
| 2017/0038648 | A1* | 2/2017 | Liu | ......................... G02F 1/1368 |

FOREIGN PATENT DOCUMENTS

| CN | 103926721 A |    | 7/2014 |
| CN | 104656334 A | * | 5/2015 |

* cited by examiner

*Primary Examiner* — Amit Chatly
(74) *Attorney, Agent, or Firm* — McDermott Will & Emery LLP

(57) ABSTRACT

A single-layer touch display panel and a device. The single-layer touch display panel includes a plurality of single-layer touch units and a plurality of display units. Each of the plurality of display units includes a red sub-pixel column, a green sub-pixel column and a blue sub-pixel column which are arranged side by side. Each of the plurality of single-layer touch units includes a transmitting electrode and a sensing electrode, which are adjacent to each other. Along a thickness direction of the single-layer touch display panel, an orthographic projection of each of the plurality of single-layer touch units respectively falls into an orthographic projection of one of the plurality of display units.

16 Claims, 12 Drawing Sheets

SINGLE-LAYER TOUCH DISPLAY PANEL AND DEVICE

CROSS-REFERENCE TO RELATED APPLICATION

This application claims priority to Chinese Patent Application No. 201710588244.X, filed on Jul. 18, 2017, titled "SINGLE-LAYER TOUCH DISPLAY PANEL AND DEVICE", which is incorporated herein by reference in its entirety.

TECHNICAL FIELD

The disclosure relates to the touch control display technology field, more particularly, to a single-layer touch display panel and a single-layer touch display device.

BACKGROUND

With a rapid development of the display technology, touch screen display devices have been generally entered into daily lives of people. For a single-layer touch display screen, a touch control layer usually uses a transparent conductive layer of ITO (Indium tin oxide) material to form an transmitting electrode and a sensing electrode by one time exposure, development and etching process, so that the single-layer touch screen has advantages of simple production process, low cost, small thickness, and so on, and thus the single-layer touch screen becomes a concerned hot topic in the display technology field in recent years.

SUMMARY

In a first aspect, embodiments of the disclosure provide a single-layer touch display panel. The single-layer touch control display comprises a plurality of single-layer touch units and a plurality of display units. Each of the plurality of display units comprises a red sub-pixel column, a green sub-pixel column and a blue sub-pixel column which are arranged side by side. Each of the plurality of single-layer touch units comprises a transmitting electrode and a sensing electrode, which are adjacent to each other. Along a thickness direction of the single-layer touch display panel, an orthographic projection of each of the plurality of single-layer touch units respectively falls into an orthographic projection of one of the plurality of display units, wherein, an orthographic projection of the sensing electrode falls into an orthographic projection of the green sub-pixel column, and an orthographic projection of the transmitting electrode falls into an orthographic projections of the red sub-pixel column and the green sub-pixel column.

Optionally, in each of the plurality of display units, both of an aperture ratio of a red sub-pixel and an aperture ratio of a blue sub-pixel are greater than an aperture ratio of a green sub-pixel.

Optionally, both of the aperture ratio of the red sub-pixel and the aperture ratio of the blue sub-pixel are 2%-5% greater than the aperture ratio of the green sub-pixel.

Optionally, in each of the plurality of display units, each sub-pixel comprises a plurality of strip sub-electrodes configured to drive a liquid crystal, wherein, a width of each of the plurality of strip sub-electrodes comprised in the red sub-pixel and that in the blue sub-pixel are greater than a width of each of the plurality of strip sub-electrodes comprised in the green sub-pixel in a case in which widths of gaps between adjacent ones of the plurality of strip sub-electrodes of each sub-pixel are same.

Optionally, the width of each of the plurality of strip sub-electrodes comprised in the red sub-pixel and that in the blue sub-pixel are 1%-3% greater than the width of each of the plurality of strip sub-electrodes comprised in the green sub-pixel.

Optionally, each sub-pixel comprises a thin film transistor electrically connected to the plurality of strip sub-electrodes, a length and a width of a channel of the thin film transistor of the red sub-pixel and those in the blue sub-pixel are greater than a length and a width of a channel of the thin film transistor of the green sub-pixel, respectively.

In a second aspect, the embodiments of the disclosure further provide another single-layer touch display panel. The single-layer touch display panel comprises a plurality of single-layer touch units and a plurality of display units. Each of the plurality of display units comprises a red sub-pixel column, a green sub-pixel column and a blue sub-pixel column which are arranged side by side. Each of the plurality of single-layer touch units comprises a transmitting electrode and sensing electrode, which are adjacent to each other. Along a thickness direction of the single-layer touch display panel, an orthographic projection of each of the plurality of the single-layer touch units respectively falls into an orthographic projection of each of the plurality of the display units, wherein, an orthographic projection of the sensing electrode falls into an orthographic projection of one of the red sub-pixel column and the blue sub-pixel column, and an orthographic projection of the transmitting electrode falls into an orthographic projection of the green sub-pixel column and another one of the red sub-pixel column and the blue sub-pixel column. Each sub-pixel in each of the plurality of display units comprises a plurality of strip sub-electrodes configured to drive a liquid crystal, wherein, widths of gaps between adjacent ones of the plurality of strip sub-electrodes of each sub-pixel are same. A width of each of the plurality of strip sub-electrodes comprised in a red sub-pixel and that in a blue sub-pixel are greater than a width of each of the plurality of strip sub-electrodes comprised in a green sub-pixel.

Optionally, the width of each of the plurality of strip sub-electrodes comprised in the red sub-pixel and that in the blue sub-pixel are 3.5%-5.5% greater than the width of each of the plurality of strip sub-electrodes comprised in the green sub-pixel.

Optionally, the orthographic projection of the transmitting electrode falls into the orthographic projection of the red sub-pixel column and the green sub-pixel column, the orthographic projection of the sensing electrode falls into the orthographic projection of the blue sub-pixel column, the width of each of the plurality of strip sub-electrodes comprised in the blue sub-pixel is greater than the width of each of the plurality of strip sub-electrodes comprised in the red sub-pixel.

Optionally, the width of each of the plurality of strip sub-electrodes comprised in the blue sub-pixel is 0.5%-1.0% greater than the width of each of the plurality of strip sub-electrodes comprised in the red sub-pixel.

Optionally, the orthographic projection of the transmitting electrode falls into the orthographic projection of the green sub-pixel column and the blue sub-pixel column, the orthographic projection of the sensing electrodes falls into the orthographic projection of the red sub-pixel column, the width of each of the plurality of strip sub-electrodes comprised in the red sub-pixel is greater than the width of each of the plurality of strip sub-electrodes comprised in the blue sub-pixel.

Optionally, the width of each of the plurality of strip sub-electrodes comprised in the red sub-pixel is 0.5%-1.0% greater than the width of each of the plurality of strip sub-electrodes comprised in the blue sub-pixel.

Optionally, each sub-pixel comprises a thin film transistor electrical connected to the plurality of strip sub-electrodes. a length and a width of a channel of the thin film transistor of a first sub-pixel are greater than the length and the width of the channel of the thin film transistor of a second sub-pixel, respectively, wherein, the width of each of the plurality of strip sub-electrodes comprised in the first sub-pixel is greater than the width of each of the plurality of strip sub-electrodes comprised in the second sub-pixel.

In a third aspect, the embodiments of the disclosure further provide a single-layer touch display device. The single-layer touch display device comprises a single-layer touch display panel described in the first aspect.

In a fourth aspect, the embodiments of the disclosure further provide a single-layer touch display device. The single-layer touch display device comprises a single-layer touch display panel described in the second aspect.

BRIEF DESCRIPTION OF THE DRAWINGS

In order to describe technical solutions in the embodiments of the disclosure more clearly, the drawings to be used in the description of the embodiments will be introduced briefly. Obviously, the drawings to be described below are merely some embodiments of the disclosure, and a person of ordinary skill in the art can obtain other drawings according to those drawings without paying any creative effort.

DETAILED DESCRIPTION

The technical solutions in the embodiments of the disclosure will be described clearly and completely with reference to the drawings in the embodiments of the disclosure. Obviously, the described embodiments are merely some but not all of embodiments of the disclosure. All other embodiments made on the basis of the embodiments of the disclosure by a person of ordinary skill in the art without paying any creative effort shall be included in the protection scope of the disclosure.

Figure 1:
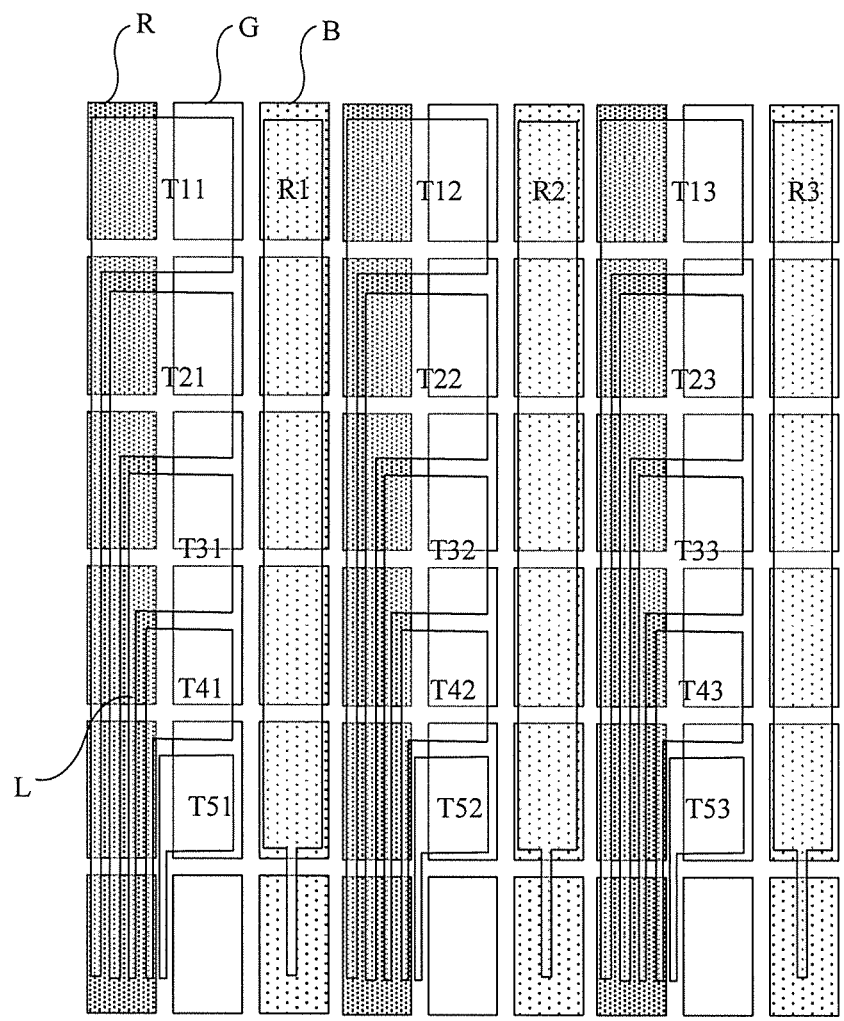
FIG. 1 is a schematic structure diagram of an exemplary single-layer touch display panel provided in the embodiments of the disclosure.

FIG. 1 is an exemplary single-layer touch display panel provided in some embodiments of the disclosure. Generally, a touch control layer of a single-layer touch control screen (single-layer conductive pattern layer) is overlapped with a display area in a display device, so that it is able to achieve a touch control function while achieving display. As shown in FIG. 1, a transmitting electrode T in the touch layer is in a block shape, and a sensing electrode R is in a strip shape. The transmitting electrode is a plurality of transmitting sub-electrodes (for example, T11, T12, T13 . . . ) arranged along a column direction of sub-pixels, and each of the plurality of transmitting sub-electrodes is connected to a lead line L, respectively. The sensing electrode (for example, R1, R2 . . . ) is one strip electrode arranged along the column direction of the sub-pixels, and the strip electrode is connected to the lead line L. The transmitting electrode T and the sensing electrode R of adjacent columns are aligned with one pixel units (for example, each one of pixel units includes a red sub-pixel, a green sub-pixel and a blue sub-pixel which are arranged side by side) column along a thickness direction of the single-layer touch display panel. That is, as shown in FIG. 1, the transmitting electrode T is arranged above a red sub-pixel column and a green sub-pixel column, and the sensing electrode R is arranged above a blue sub-pixel column.

Figure 2:
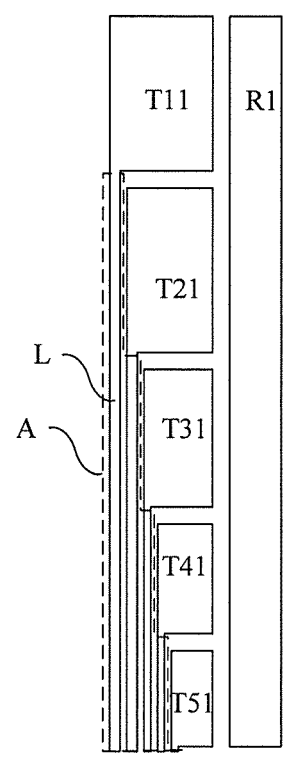
FIG. 2 is a schematic structure diagram of a single-layer touch unit of the exemplary single-layer touch display panel provided in the embodiments of the disclosure.

Based on this, since coverage rates of the transparent conductive layers of the transmitting electrode T and the sensing electrode R of the touch control layer are different, as shown in FIG. 2 (taking a group of the transmitting electrode T and the sensing electrode R adjacent to which as an example), especially for a trace area A where the lead line L of the transmitting electrode T is located, since there are gaps between adjacent lead lines L, so that a coverage rate of the transparent conductive layer of the transmitting electrode T is smaller than a coverage rate of the transparent conductive layer of the sensing electrode R. Since the transparent conductive layer has a certain blocking effect on light, the degree of light blocking of the transparent conductive layer of the transmitting electrode T is smaller than the degree of light blocking of the transparent conductive layer of the sensing electrode R when displaying, and thus a light transmittance of an area corresponding to the transmitting electrode T is greater than a light transmittance of an area corresponding to the sensing electrode R, therefore the display device generates a Mura (a bright and dark moire) phenomenon when displaying an image (especially a white state image).

Figure 3:
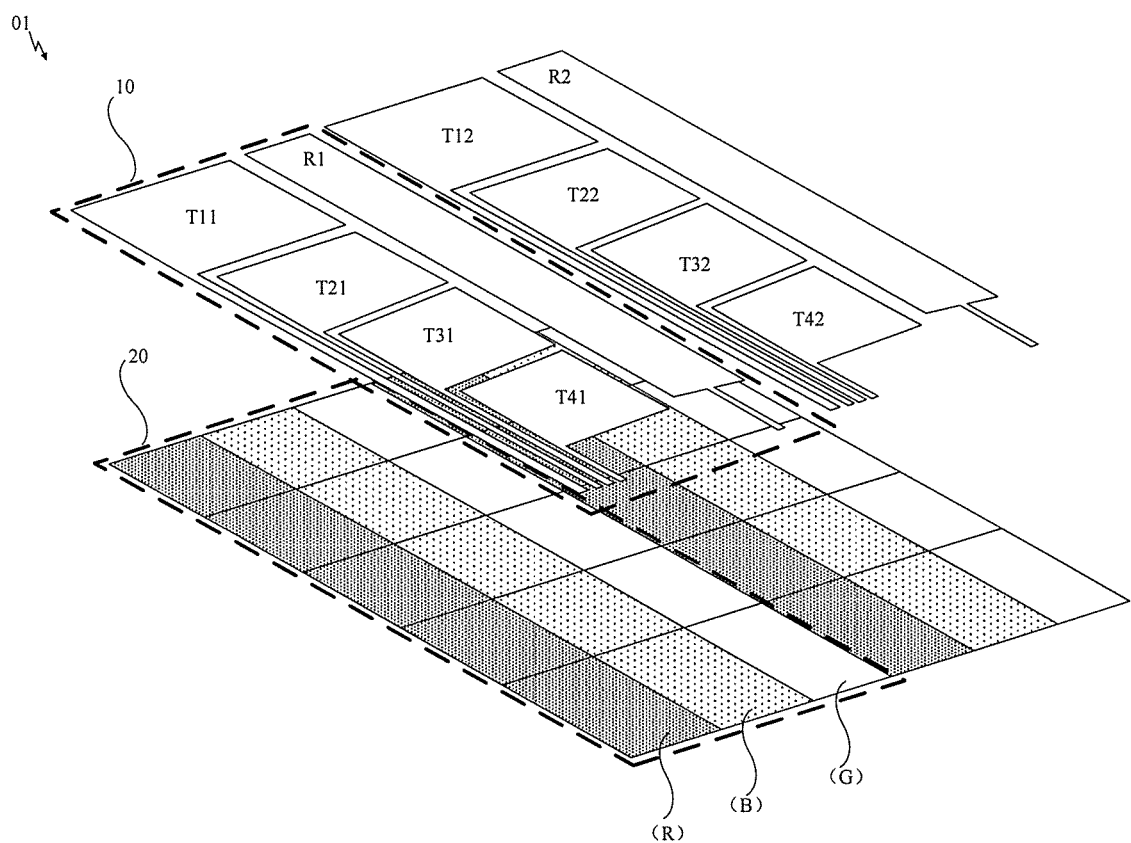
FIG. 3 is a schematic structure diagram of a single-layer touch display panel provided in the embodiments of the disclosure.

Some embodiments of the disclosure provide a single-layer touch display panel. As shown in FIG. 3, the single-layer touch display panel 01 comprises a plurality of single-layer touch units 10 and a plurality of display units 20. Each of the plurality of display units 20 comprises a red sub-pixel (R) column, a green sub-pixel (G) column and a blue sub-pixel (B) column which are arranged side by side. Each of the plurality of single-layer touch units 10 comprises a transmitting electrode T and a sensing electrode R, which are adjacent to each other. Along a thickness direction of the single-layer touch display panel 01, an orthographic projection of each of the plurality of single-layer touch units 10 respectively falls into an orthographic projection of one of the plurality of display units 20. That is, one single-layer touch unit 10 of the plurality of single-layer touch units 10 is aligned with one display unit 20 of the plurality of display units 20.

FIG. 3 is taking the single-layer touch display panel 01 comprising two single-layer touch units 10 and two display units 20, and a transmitting electrode of each of the two single-layer touch units 10 comprising four transmitting sub-electrodes (for example T11, T21, T31 and T41) as an example to illustrate only.

In addition, those skilled in the art should be understood that, the orthographic projection of each of the plurality of the single-layer touch units 10 respectively falls into the orthographic projection of each of the plurality of the display units 20 means that, the orthographic projection of each of the plurality of the single-layer touch units 10 is completely overlapped with the orthographic projection of each of the plurality of the display units 20, or the orthographic projection of each of the plurality of the single-layer touch units 10 is slightly smaller than the orthographic projection of each of the plurality of the display units 20.

It also should be noted here that, a touch control substrate formed by the plurality of the single-layer touch units 10 in the embodiments of the disclosure may be an On-Cell touch control substrate, and also may be an In-Cell touch control substrate. For example, the touch control substrate may be a One Glass Solution used commonly, which is not limited in the disclosure.

In the embodiments shown in FIG. 1, the transmitting electrode T is aligned with the red sub-pixel column and the green sub-pixel column, and the sensing electrode R is aligned with the blue sub-pixel column. Different from the arrangement manner in the embodiments shown in FIG. 1, in the embodiments shown in FIG. 3, a light transmittance of a sub-pixel is adjusted by combining colors of color resistance layers corresponding to the transmitting electrode T and the sensing electrode R, and/or a width of each of the plurality of strip sub-electrodes, thereby the Mura (the bright and dark moire) phenomenon, which is resulted by different coverage rates of transparent electrodes of the transmitting electrode T and the sensing electrode R as shown in FIG. 1, can be improved. Especially for electronic products pursued high-quality and high-resolution (such as phones and computers etc.), the competitiveness of the electronic products can be improved greatly.

Exemplarily, in the following, the adjustment of the light transmittance of the sub-pixel by combining the colors of the color resistance layers corresponding to the transmitting electrode T and the sensing electrode R, and/or the width of each of the plurality of strip sub-electrodes is going to be further illustrated by some detail embodiments.

Figure 4:
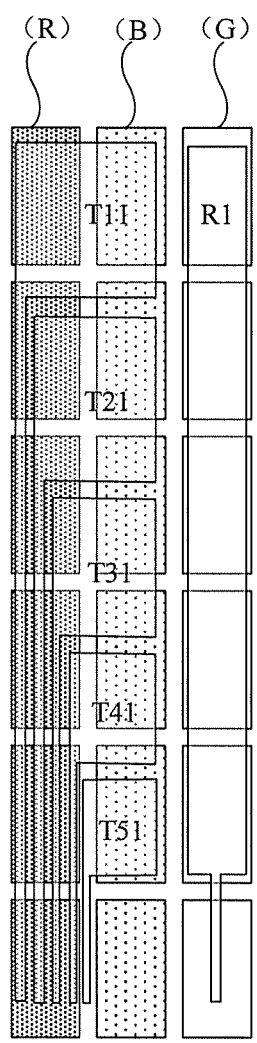
FIG. 4 is a schematic diagram of correspondences between a single-layer touch unit and sub-pixels of a display unit of the single-layer touch display panel provided in the embodiments of the disclosure.

Some embodiments of the disclosure provide a single-layer touch display panel. As shown in FIG. 3, the single-layer touch display panel 01 comprises a plurality of single-layer touch units 10 and a plurality of display units 20. Each of the plurality of display units 20 comprises a red sub-pixel (R) column, a green sub-pixel (G) column and a blue sub-pixel (B) column which are arranged side by side. Each of the plurality of single-layer touch units 10 comprises a transmitting electrode T and a sensing electrode R, which are adjacent to each other. Along a thickness direction of the single-layer touch display panel 01, an orthographic projection of each of the plurality of single-layer touch units 10 respectively falls into an orthographic projection of one of the plurality of display units 20. As shown in FIG. 4, the orthographic projection of the sensing electrode R falls into an orthographic projection of the green sub-pixel (G) column, and the orthographic projection of the transmitting electrode T falls into an orthographic projection of the red sub-pixel (R) column and the blue sub-pixel (B) column. Namely, the sensing electrode R is aligned with the green sub-pixel (G) column, and the transmitting electrode T is aligned with the red sub-pixel (R) column and the blue sub-pixel (B) column.

It should be noted that, in the above embodiments, the plurality of display units 20 have a color film layer. That is, the display panel comprising the plurality of display units 20 can be a LCD (Liquid Crystal Display), and also can be an OLED (Organic Light Emitting Diode) display panel in embodiments of the disclosure. The OLED (Organic Light Emitting Diode) display panel is a display panel having the color film layer, and light emitted from a luminescent device of the OLED display panel is white light.

Figure 5:
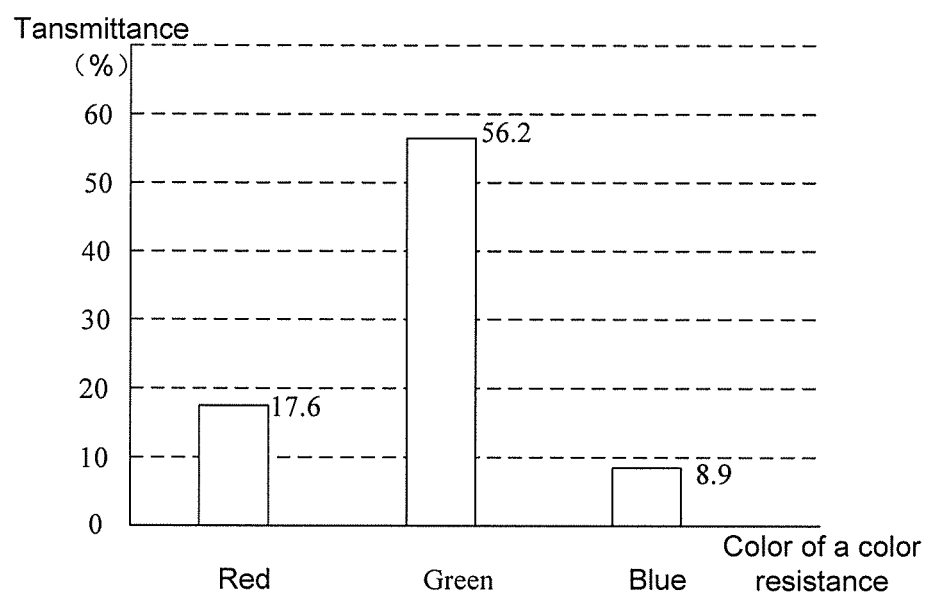
FIG. 5 is a schematic diagram of correspondences between color resistance pattern layers and transmittances, of different colors.

For the color film layer provided in the plurality of display units 20, the color film comprises a red resistance pattern layer corresponding to the red sub-pixel (R), a green color resistance pattern layer corresponding to the green sub-pixel (G) and a blue color resistance pattern layer corresponding to the blue sub-pixel (B). In practice, it can been seen from the numerical diagram of the transmittance and the color of the color resistance as shown in FIG. 5 that, in a same setting condition, a light transmittance of a green color resistance pattern layer is the biggest, reaching 56.2%, and human eyes have a strong sensitivity to green light. Light transmittances of a red color resistance pattern layer and a blue color resistance pattern layer are small relatively, which are respectively 17.6% and 8.9%, and human eyes have a low sensitivity to red light and blue light. In this way, for the plurality of display units 20 described above, a light transmittance of the green sub-pixel (G) including the green color resistance pattern layer is greater than a light transmittance of the red sub-pixel (R) including the red color resistance pattern layer and a light transmittance of the blue sub-pixel (B) including the blue color resistance pattern layer, respectively.

Based on this, in the embodiments of the disclosure, the sensing electrode R is aligned with the green sub-pixel (G) column, and the transmitting electrode T is aligned with the red sub-pixel (R) column and the blue sub-pixel (B) column (referring to FIG. 4). That is, the sensing electrode R having a large coverage rate of the transparent electrodes (i.e. having a large shielding effect for light, and the light transmittance of which is small) of the plurality of single-layer touch units 10 is aligned with the green sub-pixel (G) column having a large light transmittance, and the transmitting electrode T having a small coverage rate of the transparent electrodes (i.e. having a small shielding effect for light, and the light transmittance of which is large) of the plurality of single-layer touch units 10 is aligned with the red sub-pixel (R) column and the blue sub-pixel (B) column, which are both having a small light transmittance. In this way, for the single-layer touch display panel formed by setting the plurality of single-layer touch units 10 being aligned with the plurality of display units 20, a light transmittance of an area corresponding to the sensing electrode R is close to a light transmittance of an area corresponding to the transmitting electrode T, so that the Mura (the bright and dark moire) phenomenon in the embodiments shown in FIG. 1, which is resulted by the different coverage rates of the transmitting electrodes of the transmitting electrode T and the sensing electrode R, is improved.

Based on this, because a difference between the transmittance of the green color resistance pattern layer and the transmittance of the red color resistance pattern layer and the blue color resistance pattern layer is large, so that based on the above arrangement manner that the sensing electrode R is aligned with the green sub-pixel column, and the transmitting electrode T is aligned with the red sub-pixel column and the blue sub-pixel column, the light transmittance of the area corresponding to the sensing electrode R is also greater than the light transmittance of the area corresponding to the transmitting electrode for the whole single-layer touch display panel, and thus the effect of the above arrangement manner is limited for improving the Mura phenomenon.

Optionally, based on the arrangement manner that the sensing electrode R is aligned with the green sub-pixel column and the transmitting electrode T is aligned with the red sub-pixel column and the blue sub-pixel column shown in FIG. 4, aperture ratios of the red sub-pixel and the blue sub-pixel are set larger than a aperture ratio of the green sub-pixel, so that the light transmittances of the red sub-pixel and the blue sub-pixel are increased while the light transmittance of the green sub-pixel is reduced. In this way, it is able to further ensure that the light transmittance of the area corresponding to the sensing electrode R is closed to the light transmittance of the area corresponding to the transmitting electrode T in the whole single-layer touch display panel, and thereby improving the Mura phenomenon efficiently.

It should be noted that, those skilled in the art should be understood that, for the display panel in the embodiments shown in FIG. 1, the aperture ratios of all the sub-pixel are the same. The aperture ratios of the red sub-pixel and the blue sub-pixel are larger than the aperture ratio of the green sub-pixel in the embodiments of the disclosure. On the one hand, the transmittances of the red sub-pixel and the blue sub-pixel can be improved, while the transmittance of the green sub-pixel can be reduced, so that the light transmittance of the area corresponding to the sensing electrode R is closed to the light transmittance of the area corresponding to the transmitting electrode T in the whole single-layer touch display panel. On the other hand, area of the areas where the red sub-pixel and the blue sub-pixel are located is increased relatively, thereby facilitating the arrangement of the lead line L of the transmitting electrode T provided in the areas.

Exemplarily, since the sum of the aperture ratios of the red sub-pixel, the green sub-pixel and the blue sub-pixel is a constant when the display panel displaying normally, if the aperture ratios of the red sub-pixel and the blue sub-pixel are both greater than the aperture ratio of the green sub-pixel and an amount of a large part exceeds 5%, an increasement of the aperture ratios of the red sub-pixel and the blue sub-pixel will be too much, and a reduction of the green sub-pixel will be too much, so that the light transmittance of the green sub-pixel is smaller than the light transmittances of the red sub-pixel and the blue sub-pixel. And in this way, the light transmittance of the area corresponding to the sensing electrode R is greater than the light transmittance of the area corresponding to the transmitting electrode T, so that the Mura phenomena cannot be improved efficiently.

If the aperture ratios of the red sub-pixel and the blue sub-pixel are both larger than the aperture ratio of the green sub-pixel, and an amount of the large part is less than 2%, the increasement of the aperture ratios of the red sub-pixel and the blue sub-pixel will be too small, and the reduction of the green sub-pixel will be too small, so that the light transmittances of the red sub-pixel and the blue sub-pixel are also smaller than the light transmittance of the green sub-pixel. Thus, the light transmittance of the area corresponding to the transmitting electrode T is smaller than the light transmittance of the area corresponding to the sensing electrode R, so that the Mura phenomena cannot be improved efficiently.

In conclusion, optionally, based on the above arrangement manner that the sensing electrode R is aligned with the green sub-pixel column, and the transmitting electrode T is aligned with the red sub-pixel column and the blue sub-pixel column, the aperture ratios of the red sub-pixel and the blue sub-pixel are set to be 2%-5% greater than the aperture ratio of the green sub-pixel.

Of course, for the aperture ratios of the red sub-pixel and the blue sub-pixel, the aperture ratio of the red sub-pixel can be set to be same as the aperture ratio of the blue sub-pixel, and also can be set to be different as the aperture ratio of the blue sub-pixel. Exemplarily, the aperture ratio of the blue sub-pixel may be set to be slightly greater than the aperture ratio of the red sub-pixel.

Figure 6:
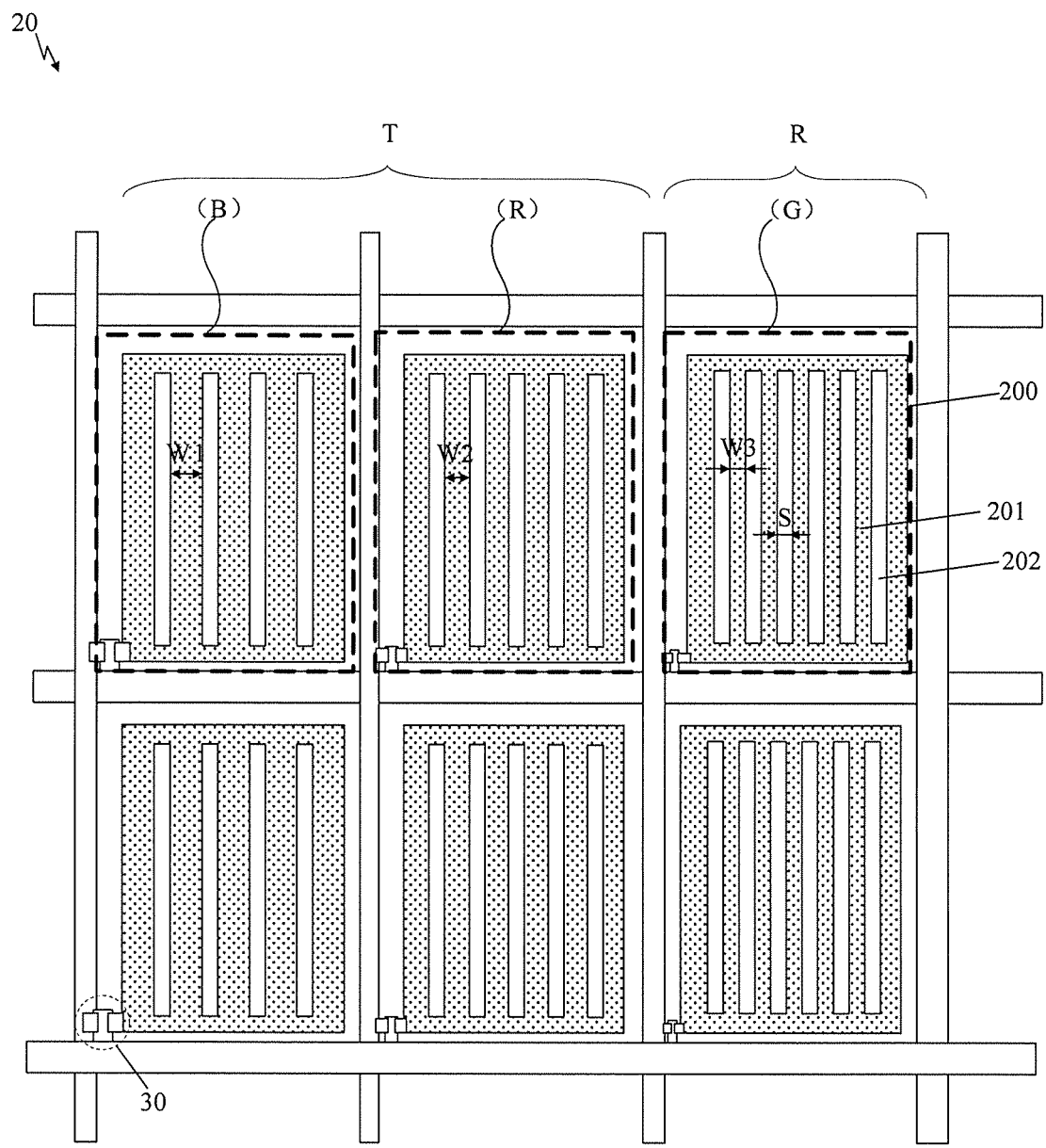
FIG. 6 is a schematic structure diagram of the display unit in the single-layer touch display panel provided in the embodiments of the disclosure.

Based on this, as shown in FIG. 6, in each of the plurality of display units 20, each sub-pixel 200 comprises a plurality of strip sub-electrodes 201 configured to drive a liquid crystal. That is, a display panel included the plurality of display units 20 is a liquid crystal display panel. And in a case in which widths of gaps 202 between adjacent ones of the plurality of strip sub-electrodes 201 of each sub-pixel 200 are the same, a width of each of the plurality of strip sub-electrodes 201 included in the red sub-pixel (R) and the blue sub-pixel (B) is larger than a width of each of the plurality of strip sub-electrodes 201 included in the green sub-pixel (G).

It should be noted here that, firstly, the display panel including the sub-pixel 200 comprising the plurality of strip sub-electrodes 201 configured to drive the liquid crystal, can be an ADS (Advanced Super Dimension Switch) type display panel (referring to FIG. 6). In the ADS type display panel, one of a pixel electrode and a common electrode is a planar electrode, and another one is a slit electrode. In this case, the adjacent ones of the plurality of strip sub-electrodes 201 described above are adjacent sub-electrodes in the slit electrodes.

Of course, the display panel described above can also be an IPS (In Plane Switch) type display panel. In the IPS type display panel, both the pixel electrode and the common electrode are the slit electrodes, and the sub-electrodes of the pixel electrode and the common electrode are spaced apart. In this case, the adjacent ones of the plurality of strip sub-electrodes 201 described above are two sub-electrodes respectively located at the pixel electrode and the common electrode. It should note that, the adjacent ones of the plurality of strip sub-electrodes 201 of the IPS type display panel may be arranged in a same layer, and also may be arranged in the different layers, they only need to be adjacent to each other in space, which is not limited in the disclosure.

Secondly, in the case in which the widths of the gaps 202 between the adjacent ones of the plurality of strip sub-electrodes 201 are same, when applying a same electrical signal to the plurality of strip sub-electrodes 201, if the width of each of the plurality of strip sub-electrodes 201 is larger, an intensity of a formed planar electric field is larger, so that the driving effect on the liquid crystal is stronger. Thus, the light transmittance of the sub-pixel 200 corresponding to the pixel electrodes including the plurality of strip sub-electrodes 201 having a larger width is increased. In this way, for the plurality of liquid crystal display units 20 described above, the light transmittances of the red sub-pixel (R) and the blue sub-pixel (G), which including the plurality of strip sub-electrodes 201 having a wide width, are both greater than the light transmittance of the green sub-pixel (G) including the plurality of strip sub-electrodes 201 having a narrow width.

Based on this, based on the above arrangement manner that the sensing electrode R is aligned with the green sub-pixel column, and the transmitting electrode T is aligned with the red sub-pixel column and the blue sub-pixel column, the width of each of the plurality of strip sub-electrodes 201 included in the red sub-pixel and the blue sub-pixel is set to be greater than the width of each of the plurality of strip sub-electrodes 201 included in the green sub-pixel, thus it is able to further ensure that the light transmittance of the area corresponding to the sensing electrode R is closer to the light transmittance of the area corresponding to the transmitting electrode T in the whole single-layer touch display panel, so that the Mura phenomenon is improved efficiently.

Exemplarily, if the width of each of the plurality of strip sub-electrodes 201 included in the red sub-pixel and the blue sub-pixel is greater than the width of each of the plurality of strip sub-electrodes 201 included in the green sub-pixel and an amount of a large part exceeds 3%, the light transmittances of the red sub-pixel and the blue sub-pixel will be obviously greater than the light transmittance of the green sub-pixel. Thus, the light transmittance of the area corresponding to the sensing electrode R is larger than the light transmittance of the area corresponding to the transmitting electrode T in the whole single-layer touch display panel, so that the Mura phenomena cannot be improved efficiently.

If the width of each of the plurality of strip sub-electrodes 201 included in the red sub-pixel and the blue sub-pixel is larger than the width of each of the plurality of strip sub-electrodes 201 included in the green sub-pixel and the amount of the large part is less than 1%, the light transmittances of the red sub-pixel and the blue sub-pixel will be obviously smaller than the light transmittance of the green sub-pixel. In this way, the light transmittance of the area corresponding to the transmitting electrode T is smaller than the light transmittance of the area corresponding to the sensing electrode R in the whole single-layer touch display panel, so that the Mura phenomena cannot be improved efficiently.

In conclusion, optionally, based on the above arrangement manner that the sensing electrode R is aligned with the green sub-pixel column, and the transmitting electrode T is aligned with the red sub-pixel column and the blue sub-pixel column, the width of each of the plurality of strip sub-electrodes 201 included in the red sub-pixel and the blue sub-pixel is set to be 1%-3% greater than the width of each of the plurality of strip sub-electrodes 201 included in the green sub-pixel.

Of course, the width of each of the plurality of strip sub-electrodes 201 included in the blue sub-pixel can be set to be same as the width of each of the plurality of strip sub-electrodes 201 included in the red sub-pixel, and also can be set to be different to the width of each of the plurality of strip sub-electrodes 201 included in the red sub-pixel. Exemplarily, the width of each of the plurality of strip sub-electrodes 201 included in the blue sub-pixel may be set to be slightly greater than the width of each of the plurality of strip sub-electrodes 201 included in the red sub-pixel. That is, as shown in FIG. 6, the width W1 of each of the plurality of strip sub-electrodes 201 included in the blue sub-pixel is greater than the width W2 of each of the plurality of strip sub-electrodes 201 included in the red sub-pixel, the width W2 of each of the plurality of strip sub-electrodes 201 included in the red sub-pixel is greater than the width W3 of each of the plurality of strip sub-electrodes 201 included in the green sub-pixel. That is, $W1>W2>W3$.

Based on this, for the sub-pixel, each sub-pixel 200 comprises a thin film transistor electrical connected to the plurality of strip sub-electrodes 201. That is, the plurality of strip sub-electrodes 201 are pixel electrodes, the pixel electrodes are charged by the thin film transistor in order to ensure a normal display. However, when the width of each of the plurality of strip sub-electrodes 201 included in the pixel electrodes of the red sub-pixel and the blue sub-pixel is greater than the width of each of the plurality of strip sub-electrodes 201 included in the pixel electrodes of the green sub-pixel, a charging current for the pixel electrodes of the red sub-pixel and the blue sub-pixel is relatively increased.

Based on this, optionally, a length and a width of a channel of the thin film transistor of the red sub-pixel and the blue sub-pixel are greater than the length and the width of the channel of the thin film transistor in the green sub-pixel, respectively. In this way, the pixel electrodes in the red sub-pixel and the blue sub-pixel are charged with a larger charging current using the thin film transistor, so that the single-layer touch display panel can emit a light stably, and thereby displaying stably.

Figure 7:
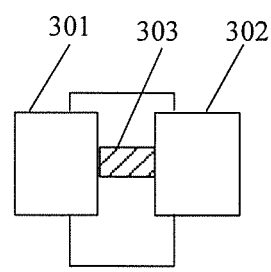
FIG. 7 is a schematic structure diagram of a thin film transistor provided in the embodiments of the disclosure.

It should be added that, as shown in FIG. 6 and FIG. 7, the thin film transistor 30 electrical connected to the plurality of strip sub-electrodes 201 comprises a source 301 and a drain 302. The channel of the thin film transistor 30 refers to a carrier channel 303 between the source 301 and the drain 302. It should be noted here that, for the length and the width of the channel 303 of the thin film transistor 30 in different sub-pixel, considering an actual aperture ratio of the sub-pixel in the display panel, the length of the channel 303 is generally set to a minimum size which can satisfy the display requirement. Based on this, in the actual production, it is able to achieve an adjustment of the charging current through the width of the channel 303 in the embodiments of the disclosure. For example, the length of the channel 303 of the thin film transistor 30 in all sub-pixel can be set to be same, the width of the channel 303 of the thin film transistor 30 of the red sub-pixel and the blue sub-pixel are greater than the width of the channel 303 of the thin film transistor 30 of the green sub-pixel, so that the pixel electrodes in the red sub-pixel and the blue sub-pixel are charged with a larger charging current through the thin film transistor 30, and thus a stability of a light can be ensured. Of course, the disclosure is not limited to the above.

In addition, in the above embodiments, for the arrangement manner that the sensing electrode R is aligned with the green sub-pixel (G) column and the transmitting electrode T is aligned with the red sub-pixel (R) column and the blue sub-pixel (B) column, the disclosure does not limit a sequential order between the red sub-pixel (R) column and the blue sub-pixel (B) column which are corresponding to the transmitting electrode T. That is, the blue sub-pixel (B) column is closer to the green sub-pixel (G) column than the red sub-pixel (R) column as shown in FIG. 4, or the red sub-pixel (R) column is closer to the green sub-pixel (G) column than the blue sub-pixel (B) column as shown in FIG. 6.

The embodiments of the disclosure further provided another single-layer touch display panel. The single-layer touch display panel 01 comprises a plurality of single-layer touch units 10 and a plurality of display units 20. Each of the plurality of display units 20 comprises a red sub-pixel (R) column, a green sub-pixel (G) column and a blue sub-pixel (B) column which are arranged side by side. Each of the plurality of single-layer touch units 10 comprises a transmitting electrode T and a sensing electrode R, which are adjacent to each other. And along a thickness direction of the single-layer touch display panel 01, an orthographic projection of each of the plurality of single-layer touch units 10 respectively falls into an orthographic projection of one of the plurality of display units 20. That is, one of the plurality of single-layer touch units 10 is aligned with one of the plurality of display units 20 (referring to FIG. 3). In each of the plurality of display units 20, each sub-pixel 200 comprises a plurality of strip sub-electrodes 201 configured to drive a liquid crystal, wherein, widths of gaps 202 between adjacent ones of the plurality of strip sub-electrodes 201 of each sub-pixel 200 are same (referring to FIG. 6).

Figure 8:
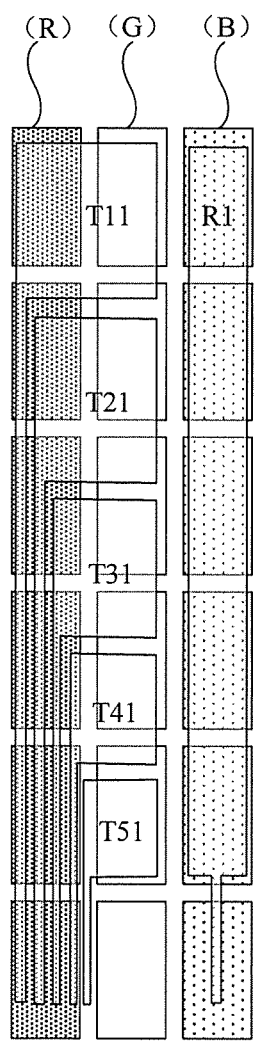
FIG. 8 is a schematic diagram of correspondences between a single-layer touch display panel and sub-pixels of a display unit in another single-layer touch display panel provided in the embodiments of the disclosure.
Figure 9:
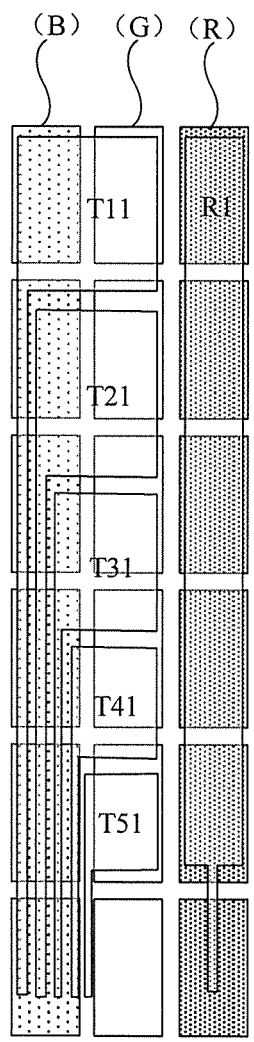
FIG. 9 is a schematic diagram of correspondences between a single-layer touch display panel and sub-pixels of a display unit in yet another single-layer touch display panel provided in the embodiments of the disclosure.

Based on this, as shown in FIG. 8 and FIG. 9, in some embodiments, an orthographic projection of the sensing electrode R falls into an orthographic projection of one of the red sub-pixel (R) column and the blue sub-pixel (B) column, and an orthographic projection of the transmitting electrode T falls into an orthographic projection of the green sub-pixel (G) column and another one of the red sub-pixel (R) column and the blue sub-pixel (B) column. That is, the sensing electrode R is aligned with one of the red sub-pixel (R) column and the blue sub-pixel (B) column, and the transmitting electrode T is aligned with the green sub-pixel (G) column and the another one of the red sub-pixel (R) column and the blue sub-pixel (B) column. In this case, a width of each of the plurality of strip sub-electrodes 201 included in red sub-pixel (R) and blue sub-pixel (B) is 3.5%-5.5% greater than a width of each of the plurality of strip sub-electrodes 201 included in green sub-pixel (G).

Based on the arrangement manner described above, in the embodiments, the width of each of the plurality of strip sub-electrodes 201 included in the red sub-pixel (R) and the blue sub-pixel (B) is set to be 3.5%-5.5% greater than the width of each of the plurality of strip sub-electrodes 201 included in the green sub-pixel (G), so that light transmittances of the red sub-pixel (R) and the blue sub-pixel (B) are both greater than a light transmittance of the green sub-pixel (G). In this way, the sensing electrode R having a large coverage rate of the transparent electrodes (i.e. having a large shielding effect for light, and the light transmittance of which is small) of the plurality of single-layer touch units 10 is aligned with one of the red sub-pixel (G) column and the blue sub-pixel (B) column, which are both having a small light transmittance, and the transmitting electrode T having a small coverage rate of the transparent electrodes (i.e. having a small shielding effect for light, and the light transmittance of which is large) of the plurality of single-layer touch units 10 is aligned with the green sub-pixel (R) column having a large light transmittance and another one of the red sub-pixel (G) column and the blue sub-pixel (B) column. Thus, a light transmittance of an area corresponding to the sensing electrode R is close to a light transmittance of an area corresponding to the transmitting electrode T, so that the Mura (the bright and dark moire) phenomenon in the embodiments shown in FIG. 1, which is resulted by the different coverage rates of the transmitting electrodes of the transmitting electrode T and the sensing electrode R, is improved.

Exemplarily, if the width of each of the plurality of strip sub-electrodes 201 included in the red sub-pixel and the blue sub-pixel is greater than the width of each of the plurality of strip sub-electrodes 201 included in the green sub-pixel and an amount of a large part exceeds 5.5%, the light transmittances of the red sub-pixel and the blue sub-pixel will be obviously greater than the light transmittance of the green sub-pixel. Thus, the light transmittance of the area corresponding to the sensing electrode R is larger than the light transmittance of the area corresponding to the transmitting electrode T in the whole single-layer touch display panel, so that the Mura phenomena cannot be improved efficiently.

If the width of each of the plurality of strip sub-electrodes 201 included in the red sub-pixel and the blue sub-pixel is larger than the width of each of the plurality of strip sub-electrodes 201 included in the green sub-pixel and the amount of the large part is less than 3.5%, the light transmittances of the red sub-pixel and the blue sub-pixel will be obviously smaller than the light transmittance of the green sub-pixel. In this way, the light transmittance of the area corresponding to the transmitting electrode T is smaller than the light transmittance of the area corresponding to the sensing electrode R in the whole single-layer touch display panel, so that the Mura phenomena cannot be improved efficiently.

In conclusion, in the embodiments, the width of each of the plurality of strip sub-electrodes 201 included in the red sub-pixel (R) and the blue sub-pixel (B) is set to be 3.5%-5.5% greater than the width of each of the plurality of strip sub-electrodes 201 included in the green sub-pixel (G).

In the case of the above arrangement that the orthographic projection of the sensing electrode R falls into the orthographic projection of one of the red sub-pixel (R) column and the blue sub-pixel (B) column, and the orthographic projection of the transmitting electrode T falls into the orthographic projection of the green sub-pixel (G) column and another one of the red sub-pixel (R) column and the blue sub-pixel (B) column, a detailed arrangement of the width of each of the plurality of strip sub-electrodes 201 included in the red sub-pixel (R) and the blue sub-pixel (B), a detailed corresponding relationship between the transmitting electrode T and sub-pixels columns and a detailed corresponding relationship between the sensing electrode R and the sub-pixels columns will be further described below.

For example, in an arrangement manner that the width of each of the plurality of strip sub-electrodes 201 included in the blue sub-pixel (B) is 0.5%-1.0% greater than the width of each of the plurality of strip sub-electrodes 201 included in the red sub-pixel (R), the light transmittance of the blue sub-pixel (B) is greater than the light transmittance of the red sub-pixel (R). That is, the blue sub-pixel (B) are brighter than the red sub-pixel (R). Based on this, the orthographic projection of the sensing electrode R falls into the orthographic projection of the blue sub-pixel (B), and the orthographic projection of the transmitting electrode T falls into the orthographic projection of the green sub-pixel (G) and the red sub-pixel (R). That is, the sensing electrode R is aligned with the blue sub-pixel (B), and the transmitting electrode T is aligned with the green sub-pixel (G) and the red sub-pixel (R).

In this way, the light transmittance of the area corresponding to the transmitting electrode is close to the light transmittance of the area corresponding to the sensing electrode, so that the Mura phenomena can be improved efficiently.

It should note that, in the above arrangement manner, the disclosure does not limit the sequential order of the green sub-pixel (G) and the red sub-pixel (R), which are aligned with the transmitting electrode T. The green sub-pixel (G) may be arranged closer to the blue sub-pixel (B) than the red sub-pixel (R), and the red sub-pixel (R) may be arranged closer to the blue sub-pixel (B) than the green sub-pixel (G).

Another example, in an arrangement manner of the width of each of the plurality of strip sub-electrodes 201 included in the red sub-pixel (R) is 0.5%-1.0% greater than the width of each of the plurality of strip sub-electrodes 201 included in the blue sub-pixel (B), the light transmittance of the blue sub-pixel (B) is smaller than the light transmittance of the red sub-pixel (R). That is, the blue sub-pixel (B) are darker than the red sub-pixel (R). Based on this, as shown in FIG. 9, the orthographic projection of the sensing electrode R falls into the orthographic projection of the red sub-pixel (R), and the orthographic projection of the transmitting electrode T falls into the orthographic projection of the green sub-pixel (G) and the blue sub-pixel (B). That is, the sensing electrode R is aligned with the red sub-pixel (R), and the transmitting electrode T is right aligned with the green sub-pixel (G) and the blue sub-pixel (B).

In this way, the light transmittance of the area corresponding to the transmitting electrode is close to the light transmittance of the area corresponding to the sensing electrode, so that the Mura phenomena can be improved efficiently.

It should note that, in the above arrangement manner, the disclosure does not limit the sequential order between the green sub-pixel (G) and the blue sub-pixel (B), which are aligned with the transmitting electrode T. The green sub-pixel (G) may be arranged closer to the red sub-pixel (R) than the blue sub-pixel (B), and the blue sub-pixel (B) may be also arranged closer to the red sub-pixel (R) than the green sub-pixel (G).

Based on this, for a sub-pixel, each sub-pixel 200 comprises a thin film transistor electrical connected to the plurality of strip sub-electrodes 201. That is, the plurality of strip sub-electrodes 201 are pixel electrodes. The pixel electrodes are charged by the thin film transistor, so that a normal display is ensured. However, for a case that the width of each of the plurality of strip sub-electrodes 201 included in a first sub-pixel is greater than the width of each of the plurality of strip sub-electrodes 201 included in a second sub-pixel, for example, the width of each of the plurality of strip sub-electrodes 201 included in the red sub-pixel (R) and the blue sub-pixel (B) is greater than the width of each of the plurality of strip sub-electrodes 201 included in the green sub-pixel (G), the red sub-pixel (R) and the blue sub-pixel (B) are served as the first sub-pixel, and the green sub-pixel (G) are served as the second sub-pixel. Optionally, a length and a width of a channel of the thin film transistor of the first sub-pixel are greater than the length and the width of the channel of the thin film transistor of the second sub-pixel, respectively. In this way, it is able to ensure that the first sub-pixel having the plurality of strip sub-electrodes 201 with a wide width being charged with a stronger current by the thin film transistor, to ensure the homogeneity of emitted light, and to improve the Mura phenomenon when the stability of an image display is satisfied, That is, the length and the width of the channel of the thin film transistor of the red sub-pixel (R) and the blue sub-pixel (B) are greater than the length and the width of the channel of the thin film transistor in the green sub-pixel (G), respectively.

Of course, the relationship of size between the length and the width of the channel of the thin film transistors of the red sub-pixel (R) and the blue sub-pixel (B) can be set in the same principle as described above, which will not be described in detail herein.

It should note that, the arrangement of the length and the width of the channel of the thin film transistor described above can be referred to the arrangement of the length and width of the channel in the embodiments described above. The length of the channel in all sub-pixels can be set to be the same, and the adjustment of the charging current can be achieved only through the width of the channel, which will not be described in detail herein.

Figure 10:
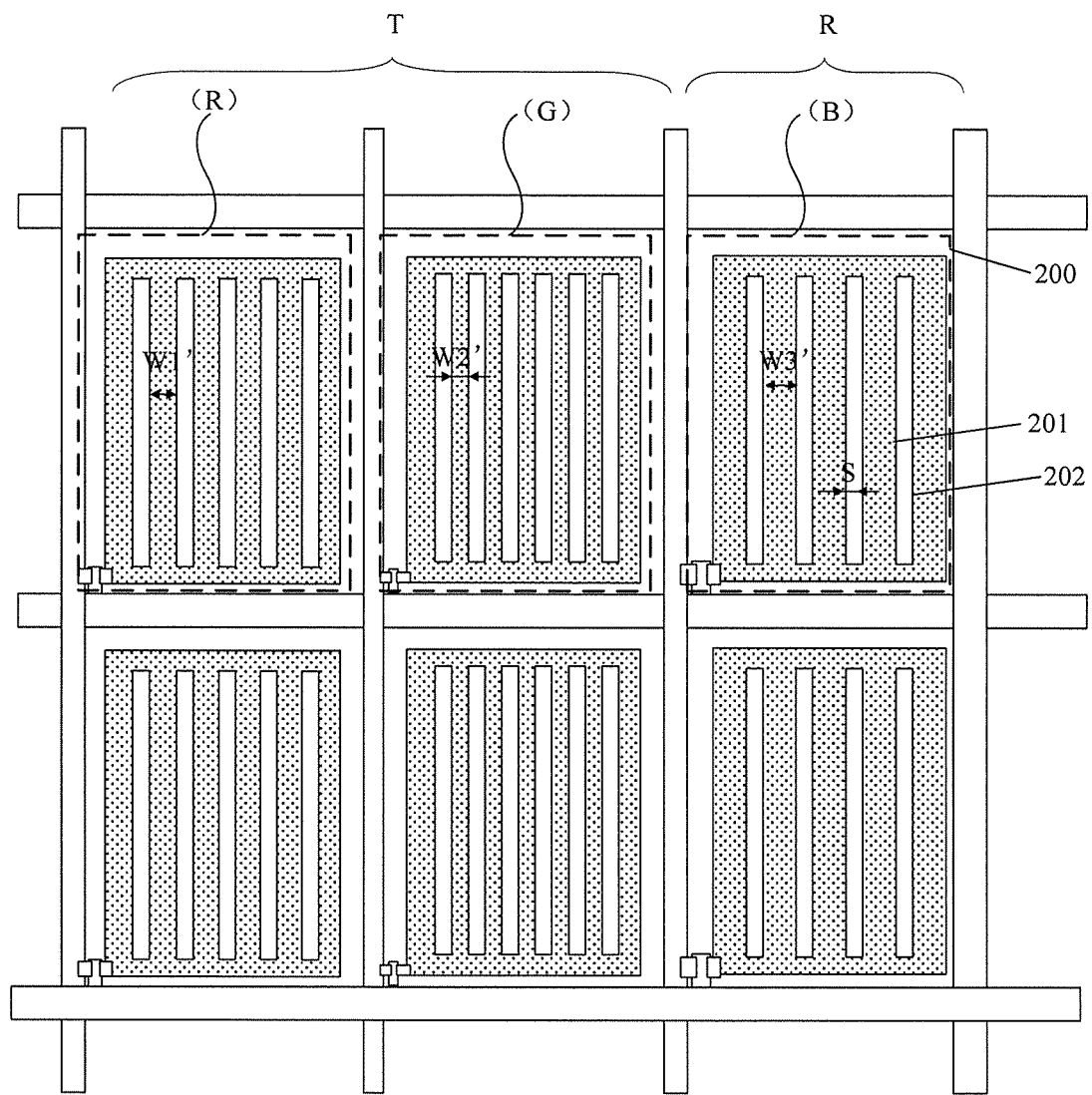
FIG. 10 is a schematic structure diagram of the display unit in FIG. 8 provided in the embodiments of the disclosure.

In the following, the disclosure will be further described by taking the specific embodiments shown in FIG. 8 as an example. As shown in FIG. 8, the width of each of the plurality of strip sub-electrodes 201 included in the blue sub-pixel (B) is 0.5%-1.0% greater than the width of each of the plurality of strip sub-electrodes 201 included in the red sub-pixel (R), the sensing electrode R is aligned with the blue sub-pixel (B), and the transmitting electrode T is aligned with the green sub-pixel (G) and the red sub-pixel (R). Exemplarily, referring to FIG. 10, the width W3' of each of the plurality of strip sub-electrodes 201 included in the blue sub-pixel (B) is greater than the width W1' of each of the plurality of strip sub-electrodes 201 included in the red sub-pixel (R), and the width W1' of each of the plurality of strip sub-electrodes 201 included in the red sub-pixel (R) is greater than the width W3' of each of the plurality of strip sub-electrodes 201 included in the green sub-pixel (G). That is, W3'>W1'>W2'.

Figure 11:
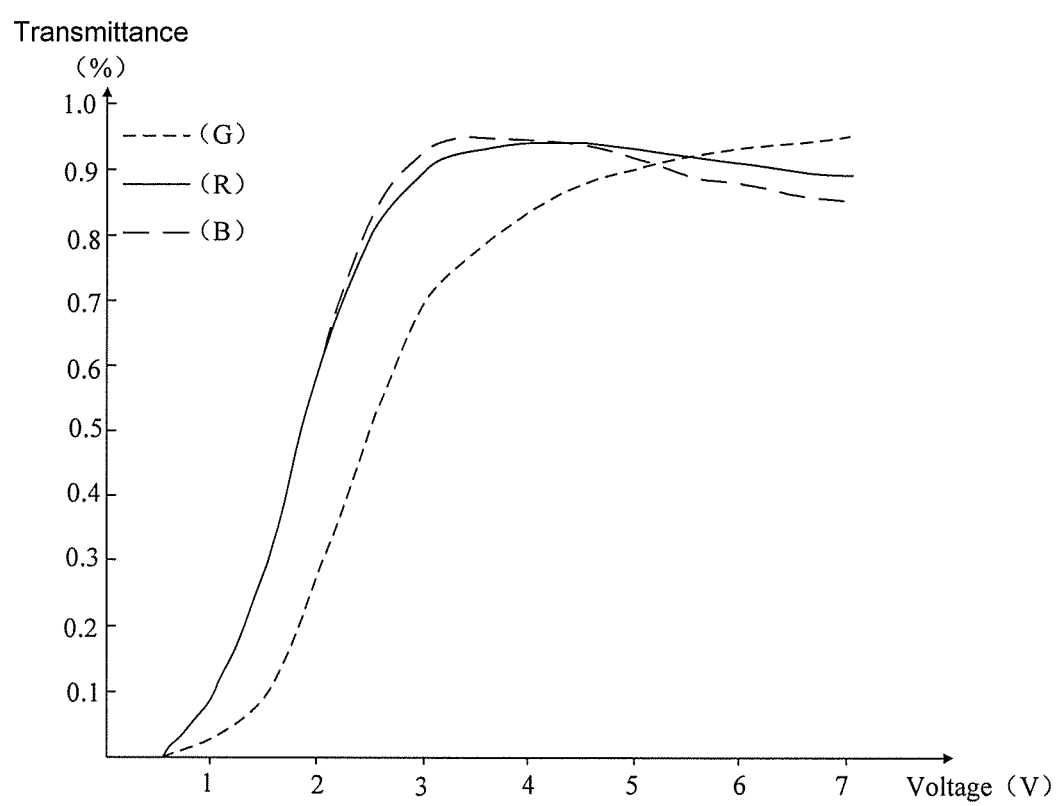
FIG. 11 is a line graph of a relationship between a pixel voltage and a light transmittance of a display panel without a touch control layer provided in the embodiments of the disclosure.

In the case that the display panel formed by the display unit 20 described above does not include a touch control layer formed by the single-layer touch unit 10, a relationship between a voltage applied to the pixel electrodes and the light transmittances of the red sub-pixel (R), the green sub-pixel (G) and the blue sub-pixel (B) of the display panel is shown in FIG. 11. It can be seen from FIG. 11 that, the light transmittances of the red sub-pixel (R) and the blue sub-pixel (B) are both greater than the light transmittance of the green sub-pixel (G).

It should be noted here that, FIG. 11 is a diagram of the relationship between the voltage applied to the pixel electrodes and the light transmittance of the sub-pixels of different colors. As shown in FIG. 11, when the voltage applied to the pixel electrodes is less than 5V, the light transmittances of the red sub-pixel (R) and the blue sub-pixel (B) are both greater than the light transmittance of the green sub-pixel (G). While when the voltage applied to the pixel electrodes is greater than 5V, the light transmittance of the green sub-pixel (G) is greater than the light transmittances of the red sub-pixel (R) and the blue sub-pixel (B). However, considering that in a normal display, most of pixel voltages are within 5V, therefore, in the embodiments of the disclosure, the corresponding relationship between the voltage applied to the pixel electrodes and the light transmittances of the sub-pixels of the different colors can be ignored when the voltage applied to the pixel electrodes is greater than 5V. Only the corresponding relationship between the voltage applied to the pixel electrodes and the light transmittances of the sub-pixels of the different colors when the voltage applied to the pixel electrodes is less than 5V is used as a reference.

Figure 12:
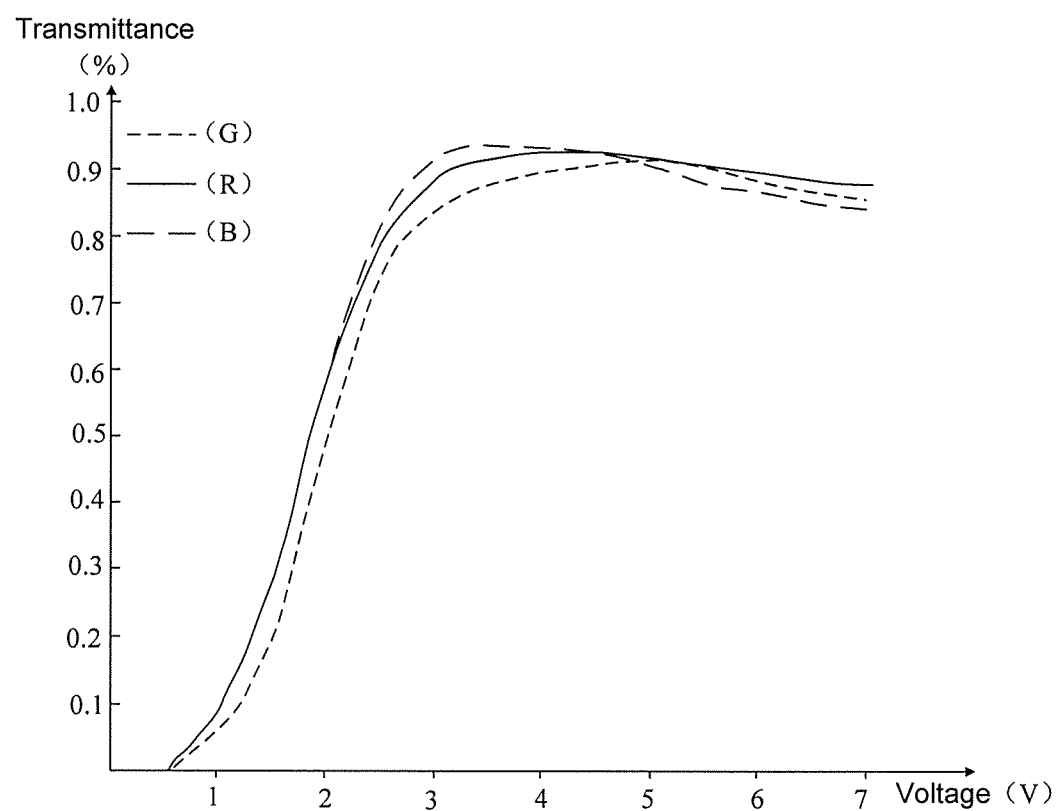
FIG. 12 is a line graph of a relationship between a pixel voltage and a light transmittances of a single-layer touch display panel provided in the embodiments of the disclosure.

Based on this, a touch control layer formed by the plurality of single-layer touch units 10 is provided in the display panel arranged in the arrangement manner, and the transmitting electrode T of each of the plurality single-layer touch units 10 is aligned with the green sub-pixel (G) column and the red sub-pixel (R) column, and the sensing electrode R is aligned with the blue sub-pixel (B) column. Based on this, FIG. 12 is a diagram of a relationship between the voltage applied to the pixel electrodes and the light transmittances of the red sub-pixel (R), the green sub-pixel (G) and the blue sub-pixel (B) after arranging the touch control layer. It can be seen from FIG. 12 that, the light transmittance of a position corresponding to the blue sub-pixel (B) column (i.e. a sensing electrode R column) is closer to the light transmittance of a position corresponding to the green sub-pixel (G) column and the red sub-pixel (R) column (i.e. the transmitting electrode T). That is, it is able to improve the Mura phenomenon of the display image when displaying by the above arrangement manner.

Figure 13:
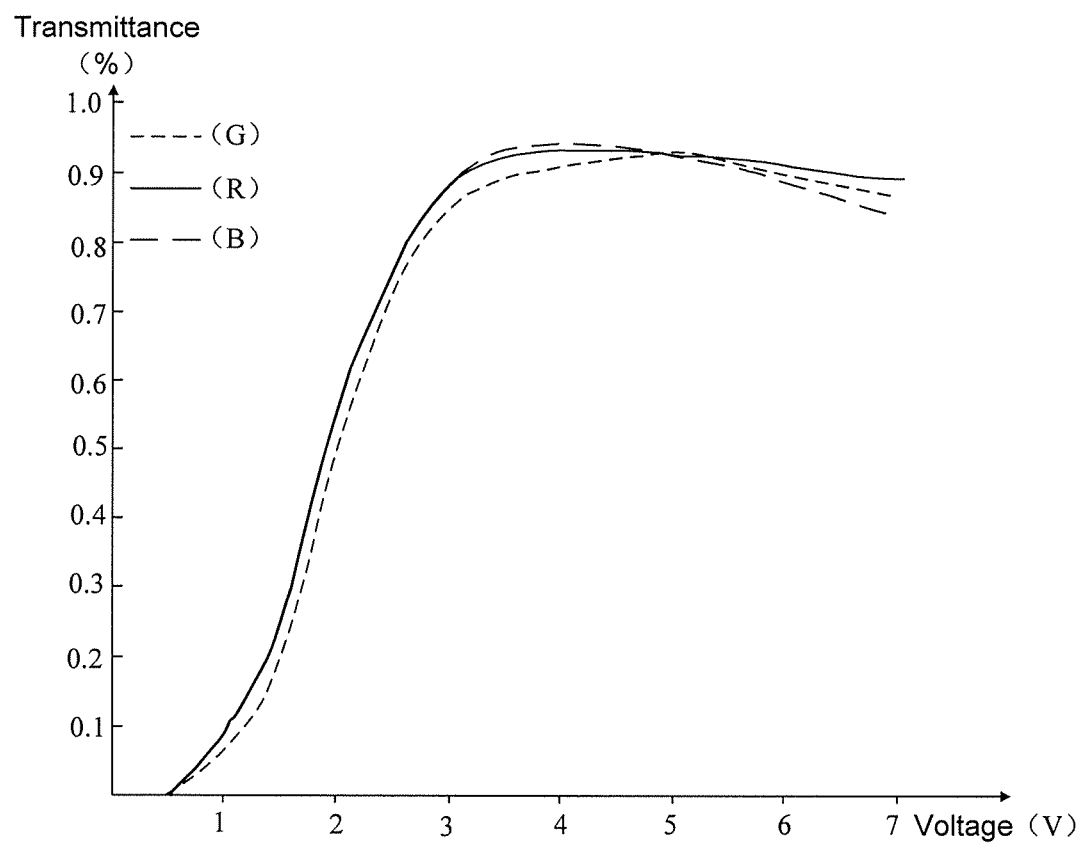
FIG. 13 is a line graph of a relationship between a pixel voltage and a light transmittance of another single-layer touch display panel provided in the embodiments of the disclosure.

Further, on the basis of the single-layer touch display panel corresponding to FIG. 12, the length and the width of the channel of the thin film transistor in the sub-pixels having the plurality of strip sub-electrodes with the wide width are increased according to the reason described above. For example, the length and the width of the channel of the thin film transistor of the blue sub-pixel (B) and the red sub-pixel (R) can be arranged greater than the length and the width of the channel of the thin film transistor of the green sub-pixel (G), and the length and the width of the channel of the thin film transistor of the blue sub-pixel (B) is greater than the length and the width of the channel of the thin film transistor of the red sub-pixel (R). FIG. 13 is a diagram of a relationship between the voltage applied to the pixel electrodes and the light transmittances of the red sub-pixel (R), the green sub-pixel (G) and the blue sub-pixel (B) in the single-layer touch display panel after adjusting the length and width of the channel of the thin film transistor. In this way, it can be seen from FIG. 13 that, the light transmittance of the position corresponding to the blue sub-pixel (B) column (i.e. the sensing electrode R column) is further close to the light transmittance of the position corresponding to the green sub-pixel (G) column and the red sub-pixel (R) column (i.e. the transmitting electrode T). That is, it is able to further efficient improve the Mura phenomenon when displaying by the above arrangement manner.

It should be noted that, compared to the single-layer touch display panel of which the light transmittance of the green sub-pixel (G) is the largest, in the above embodiments, the light transmittances of the red sub-pixel (R) and the blue sub-pixel (B) are greater than the light transmittance of the green sub-pixel (G) by setting the width of each of the plurality of strip sub-electrodes 201 included in the red sub-pixel (R) and the blue sub-pixel (B) being 3.5%-5.5% greater than the width of each of the plurality of strip sub-electrodes 201 included in the green sub-pixel (G), so that the light transmittance of the area corresponding to the sensing electrode R is further close to the light transmittance of the area corresponding to the transmitting electrode T. That is, an overall light transmittance of the single-layer touch display panel illustrated in FIG. 9 is greater than the overall light transmittance of the single-layer touch display panel illustrated in FIG. 3.

In addition, an adjustment process of the single-layer touch display panel (taking the liquid crystal display panel as an example) before a mass production is further described below combining the above embodiments.

Firstly, an array substrate is manufactured according to actual predetermined parameters (such as the widths of each of the plurality of the strip electrodes, the width of the gaps between adjacent ones of the plurality of the strip electrodes and so on).

Then, a color film pattern layer is manufactured according to a predetermined arrangement of colors of the sub-pixel and a corresponding aperture ratio on the array substrate to form a color film substrate.

Next, the array substrate and the color film substrate described above are jointed, and the touch control layer comprising the single-layer touch units and dense lines is manufactured on a surface of the color film substrate.

Next, a lighting technology is performed, and a Mura level of the display panel is determined by ET (Electrical Test). If the coverage ratio of the electrodes of the touch control layer, the gap sizes of the lines and so on are needed to adjust, the adjustment can be performed again to achieve a target effect.

Lastly, the touch control layer and the display panel described above are cured, and a monitoring of subsequent mass production can be started.

A single-layer touch display device is also provided in the embodiments of the disclosure. The single-layer touch display device comprises a single-layer touch display panel described above. The single-layer touch display device has a same structure and beneficial effects with the single-layer touch display panel provided in the embodiments described above. Since the structure and the beneficial effects of the single-layer touch display panel have been detail described in the embodiments described above, it will not be repeated here.

The above descriptions are merely specific implementation manners of the disclosure, but the protection scope of the present disclosure is not limited thereto. Any person skilled in the art can easily think of changes or replacements within the technical scope disclosed by the disclosure, and the changes or replacements should be covered by the protection scope of the disclosure. Therefore, the protection scope of the disclosure should be based on the protection scope of the claims.

What is claimed is:

1. A single-layer touch display panel, comprising:
  a plurality of single-layer touch units, each of the plurality of single-layer touch units comprises a transmitting electrode and a sensing electrode which are adjacent to each other;
  a plurality of display units, each of the plurality of display units comprises a red sub-pixel column, a green sub-pixel column and a blue sub-pixel column which are arranged side by side; wherein,
  along a thickness direction of the single-layer touch display panel, an orthographic projection of each of the plurality of single-layer touch units respectively falls into an orthographic projection of one of the plurality of display units, wherein, an orthographic projection of the sensing electrode falls into an orthographic projection of the green sub-pixel column, an orthographic projection of the transmitting electrode falls into an orthographic projection of the red sub-pixel column and the blue sub-pixel column,
  wherein each sub-pixel comprises a thin film transistor electrically connected to a plurality of strip sub-electrodes, and
  wherein a length and a width of a channel of the thin film transistor in a red sub-pixel and those in a blue sub-pixel are greater than a length and a width of a channel of the thin film transistor of a green sub-pixel, respectively.

2. The single-layer touch display panel according to claim 1, wherein, in each of the plurality of display units, both of an aperture ratio of the red sub-pixel and an aperture ratio of the blue sub-pixel are greater than an aperture ratio of the green sub-pixel.

3. The single-layer touch display panel according to claim 2, wherein, both of the aperture ratio of the red sub-pixel and the aperture ratio of the blue sub-pixel are 2%-5% greater than the aperture ratio of the green sub-pixel.

4. The single-layer touch display panel according to claim 1, wherein, in each of the plurality of display units, each sub-pixel comprises the plurality of strip sub-electrodes configured to drive a liquid crystal; wherein,
a width of each of the plurality of strip sub-electrodes comprised in the red sub-pixel and that in the blue sub-pixel are greater than a width of each of the plurality of strip sub-electrodes comprised in the green sub-pixel, in a case in which widths of gaps between adjacent ones of the plurality of strip sub-electrodes of each sub-pixel are same.

5. The single-layer touch display panel according to claim 4, wherein, the width of each of the plurality of strip sub-electrodes comprised in the red sub-pixel and that in the blue sub-pixel are 1%-3% greater than the width of each of the plurality of strip sub-electrodes comprised in the green sub-pixel.

6. A single-layer touch display panel, comprising:
a plurality of single-layer touch units, each of the plurality of single-layer touch units comprises a transmitting electrode and sensing electrode which are adjacent to each other;
a plurality of display units, each of the plurality of display units comprises a red sub-pixel column, a green sub-pixel column and a blue sub-pixel column which are arranged side by side; wherein,
along a thickness direction of the single-layer touch display panel, an orthographic projection of each of the plurality of the single-layer touch units respectively falls into an orthographic projection of each of the plurality of the display units, wherein,
an orthographic projection of the sensing electrode falls into an orthographic projection of one of the red sub-pixel column and the blue sub-pixel column, an orthographic projection of the transmitting electrode falls into an orthographic projection of the green sub-pixel column and another one of the red sub-pixel column and the blue sub-pixel column;
each sub-pixel in each of the plurality of display units comprises a plurality of strip sub-electrodes configured to drive a liquid crystal, wherein, widths of gaps between the adjacent ones of the plurality of strip sub-electrodes of each sub-pixel are same;
a width of each of the plurality of strip sub-electrodes comprised in a red sub-pixel and that in a blue sub-pixel are greater than a width of each of the plurality of strip sub-electrodes comprised in a green sub-pixel,
wherein each sub-pixel comprises a thin film transistor electrically connected to a plurality of strip sub-electrodes, and
wherein a length and a width of a channel of the thin film transistor in a first sub-pixel are greater than a length and a width of a channel of the thin film transistor in a second sub-pixel, respectively, wherein, the width of each of the plurality of strip sub-electrodes comprised in the first sub-pixel is greater than the width of each of the plurality of strip sub-electrodes comprised in the second sub-pixel.

7. The single-layer touch display panel according to claim 6, wherein, the width of each of the plurality of strip sub-electrodes comprised in the red sub-pixel and that in the blue sub-pixel are 3.5%-5.5% greater than the width of each of the plurality of strip sub-electrodes comprised in the green sub-pixel.

8. The single-layer touch display panel according to claim 6, wherein,
the orthographic projection of the transmitting electrode falls into the orthographic projection of the red sub-pixel column and the green sub-pixel column, the orthographic projection of the sensing electrode falls into the orthographic projection of the blue sub-pixel column;
the width of each of the plurality of strip sub-electrodes comprised in the blue sub-pixel is greater than the width of each of the plurality of strip sub-electrodes comprised in the red sub-pixel.

9. The single-layer touch display panel according to claim 8, wherein, the width of each of the plurality of strip sub-electrodes comprised in the blue sub-pixel is 0.5%-1.0% greater than the width of each of the plurality of strip sub-electrodes comprised in the red sub-pixel.

10. The single-layer touch display panel according to claim 6, wherein,
the orthographic projection of the transmitting electrode falls into the orthographic projection of the green sub-pixel column and the blue sub-pixel column, the orthographic projection of the sensing electrodes falls into the orthographic projection of the red sub-pixel column;
the width of each of the plurality of strip sub-electrodes comprised in the red sub-pixel is greater than the width of each of the plurality of strip sub-electrodes comprised in the blue sub-pixel.

11. The single-layer touch display panel according to claim 10, wherein, the width of each of the plurality of strip sub-electrodes comprised in the red sub-pixel is 0.5%-1.0% greater than the width of each of the plurality of strip sub-electrodes comprised in the blue sub-pixel.

12. A single-layer touch display device, comprising a single-layer touch display panel according to claim 1.

13. A single-layer touch display device, comprising a single-layer touch display panel according to claim 6.

14. The single-layer touch display panel according to claim 1, wherein, the area where the red sub-pixel is located is larger than the area where the green sub-pixel is located, and the area where the blue sub-pixel is located is larger than the area where the green sub-pixel is located.

15. The single-layer touch display panel according to claim 1, wherein, the aperture ratio of the blue sub-pixel is slightly greater than the aperture ratio of the red sub-pixel.

16. The single-layer touch display panel according to claim 1, wherein, the transmitting electrode of each of the plurality of single-layer touch units includes a plurality of block shape electrodes which are separated and insulated from each other; each of the plurality of block shape electrodes is connected to a lead line, and lead lines of the plurality of block shape electrodes are separated and insulated from each other.

* * * * *